United States Patent [19]
DeKiss

[11] 3,757,650
[45] Sept. 11, 1973

[54] RECIPROCATORY FLUID ACTUATED MOTOR HAVING A RACK AND PINION PISTON LOCKING MECHANISM

[75] Inventor: Nicholas DeKiss, North Hollywood, Calif.

[73] Assignee: DeLaval Turbine, Inc., Princeton, N.J.

[22] Filed: Feb. 22, 1972

[21] Appl. No.: 227,784

[52] U.S. Cl. .................................... 92/25, 188/67
[51] Int. Cl. ............................................ F15b 15/26
[58] Field of Search ...................... 92/15, 18, 19, 20, 92/24, 25; 91/44; 188/67

[56] References Cited
UNITED STATES PATENTS

| | | | |
|---|---|---|---|
| 3,167,155 | 1/1965 | Geyer | 92/18 X |
| 3,217,609 | 11/1965 | Royster | 92/25 X |
| 3,453,937 | 7/1969 | Haberman | 92/25 X |
| 3,498,187 | 3/1970 | Stringfellow | 92/24 |

Primary Examiner—Martin P. Schwadron
Assistant Examiner—Abe Hershkovitz
Attorney—Ford W. Harris, Jr. et al.

[57] ABSTRACT

A reciprocatory fluid actuated motor the piston of which carries a rack and pinion mechanism having locking elements engageable with a locking element on the cylinder to lock the piston in a predetermined position in the cylinder. The rack and pinion mechanism comprises a rack carried by and movable axially of the piston, pinion segments carried by the piston and meshed with the rack, and locking teeth on the pinion segments engageable with an annular locking shoulder in the cylinder to lock the piston in response to movement of the rack relative to the piston in one direction. A spring biases the rack in a direction to engage the locking teeth with the locking shoulder, and a retaining sleeve prevents engagement of the locking teeth with the locking shoulder until the piston approaches its locked position. Fluid pressure releases the lock when this is desired.

12 Claims, 5 Drawing Figures

PATENTED SEP 11 1973  3,757,650

RECIPROCATORY FLUID ACTUATED MOTOR HAVING A RACK AND PINION PISTON LOCKING MECHANISM

BACKGROUND OF INVENTION

The present invention relates in general to a fluid actuated motor of the reciprocatory type having means for mechanically locking the piston of the motor in at least one predetermined position longitudinally of the cylinder thereof. Such fluid operated motors are utilized in many situations where a positive mechanical lock is required to avoid the necessity of relying on sustained fluid pressure to maintain an apparatus actuated by the motor in a desired position. For example, motors of this type are widely used to lock the landing gear and flaps of airplanes in their down positions, and in their up positions also in many instances.

The desired mechanical lock in a fluid operated motor of the foregoing type has been achieved with various types of locking elements. For example, balls have been used, but are not satisfactory unless the surfaces which the balls engage match them perfectly. Otherwise, severe stresses occur as a result of small-area contact with their engagement surfaces. Locking teeth on flexible fingers have also been used. The locking teeth have the advantage of large-area contact with their mating surfaces, but the flexible fingers are vulnerable components of the locking mechanism and prone to fatigue failure.

Locking devices having pivoted pawls have the advantage of large-area contact, and avoid the problems encountered with spring fingers. For example, U.S. Pat. No. 2,249,850 to Palmer discloses a fluid operated motor wherein the piston actuates rack and pinion locks which are separate, auxiliary units having pinions carrying pawls insertable into grooves in the piston. As another example, in U.S. Pat. No. 3,498,187, the piston carries a rack meshed with a pinion carried by the cylinder and capable of being locked by a pawl carried by the cylinder. While devices of this nature have the advantage of large-area contact and the avoidance of flexible fingers, they are relatively complex and require large numbers of parts.

SUMMARY AND OBJECTS OF INVENTION

With the foregoing background in mind, a primay object of the present invention is to provide a reciprocatory fluid actuated motor having a rack and pinion piston locking mechanism which provides for large-area contact, which avoids the use of components prone to fatigue failure, and which is simple, compact, light in weight, positive in its action, and reliable.

More particularly, an important object of the invention is to provide a unit wherein the rack and pinion locking means is carried by the piston and is engageable with the cylinder in the locked position of the piston.

The invention may be summarized as including, and another important object is to provide a reciprocatory fluid actuated motor which includes: a cylinder; a piston reciprocable in the cylinder toward and away from a locked position; a rack member carried by and reciprocable relative to the piston between retracted and extended positions and including a rack; a pinion segment carried by the piston and meshed with the rack and having a first locking element therein, the pinion segment being pivotable between a retracted position wherein the fist locking element is retracted laterally of the piston and an extended position wherein the first locking element is extended laterally of the piston, such pivoting of the pinion segment occurring in response to movement of the rack member between its retracted and extended positions, respectively; a second locking element carried by the cylinder and engageable by the first locking element in the extended position of the pinion segment; and actuating means for moving the rack member between its retracted and extended positions relative to the piston. A related object is to provide retaining means for retaining the pinion segment and the rack member in their retracted positions when the piston is spaced from the locked position thereof.

Another object is to provide a retaining means for the pinion segment which includes: a retaining sleeve slideable on the piston between an extended position, wherein it engages the pinion segment to retain it in its retracted position, and a retracted position; spring means biasing the retaining sleeve toward its extended position; and means on the cylinder for moving the retaining sleeve toward its retracted position in response to movement of the piston toward its locked position.

An additional object is to provide a device wherein the actuating means for the rack member comprises means for applying fluid pressure to opposite ends of the rack member.

A further object is to provide a reciprocatory fluid actuated motor wherein the locking element on the pinion segment is a locking tooth engageable with an internal annular locking shoulder in the cylinder. A related object is to provide a construction wherein the shoulder and the tooth are complementarily radiused.

Still another object is to provide a construction wherein there are two circumferentially spaced racks on the rack member and two circumferentially spaced pinion segments respectively meshed with the racks and respectively having locking teeth engageable with the annular locking shoulder in the cylinder.

A still further object is to provide a device wherein the rack is cylindrical with annular teeth, there being a plurality of pinion segments circumferentially spaced around and meshed with the rack and respectively having locking teeth engageable with the annular locking shoulder in the cylinder.

The foregoing objects, advantages, features and results of the present invention, together with various other objects, advantages, features and results of the invention which will be evident to those skilled in the art in the light of this disclosure, may be achieved with the exemplary embodiments of the invention illustrated in the accompanying drawing and described in detail hereinafter.

DETAILED DESCRIPTION OF EXEMPLARY EMBODIMENTS OF INVENTION

Figure 1:
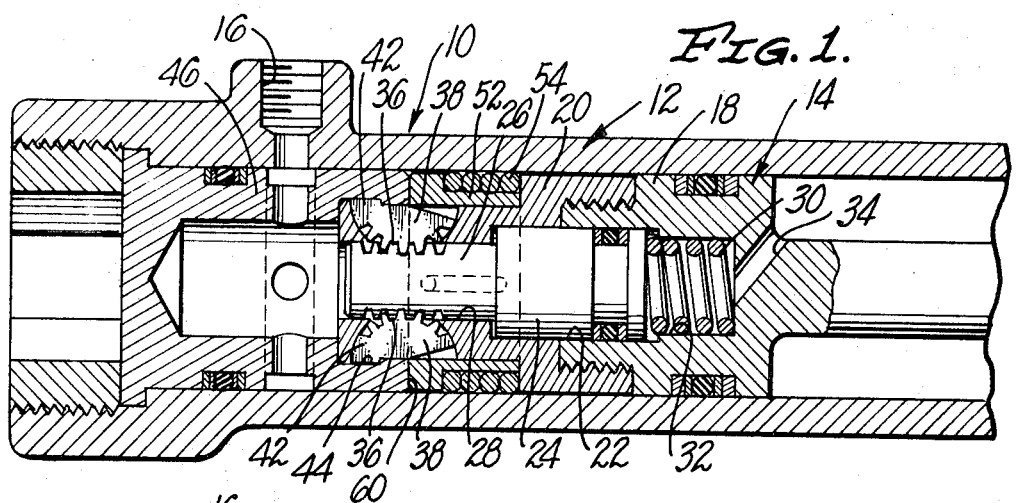
FIG. 1 is a longitudinal sectional view of one end of a reciprocatory fluid actuated motor embodying the rack and pinion piston locking means of the invention, the piston being shown in its locked position and locked.

Referring initially to FIGS. 1 to 4 of the drawing, the reciprocatory fluid operated motor of the invention is designated generally by the numeral 10 and includes a cylinder 12 within which a piston 14 is reciprocable. The piston 14 is shown in its locked position in FIG. 1, and is shown as spaced slightly from its locked position in FIGS. 2, 3 and 4. The piston 14 may be displaced away from its locked position, i.e., to the right as viewed in the drawing, by fluid under pressure introduced through a port 16 in the cylinder 12. Conversely, the piston 14 may be displaced toward its locked position by fluid introduced into the cylinder 12 through a port, not shown, to the right of the piston, again as viewed in the drawing.

The piston 14, in the particular construction illustrated, comprises a body 18 carrying an axial extension 20. Formed in the piston body 18 and its extension 20 is a bore 22 for a plunger 24 carrying an axially extending actuating member 26, specifically a rack member, in a bore 28 in the piston extension 20. Spring means comprising a compression coil spring 30 biases the rack member 26 axially toward an extended position thereof, as shown in FIG. 1. The spring 30 is seated at one end against the end of the plunger 24 opposite the rack member 26, and is seated at its other end against an end wall of a cylindrical recess 32 containing the spring. A port 34 in the piston body 28 connects the recess 32 to the cylinder 12 on the right side of the piston 14, as viewed in the drawing.

The rack member 26 is provided with racks 36 on opposite sides thereof, these racks being circumferentially spaced apart by 180° in the particular construction illustrated. Meshed with the respective racks 36 are pinion segments 38 disposed in complementary arcuate cavities 40 in the piston extension 20. These cavities extend inwardly from the periphery of the piston extension 20 to the bore 28 for the rack member 26.

Figure 3:
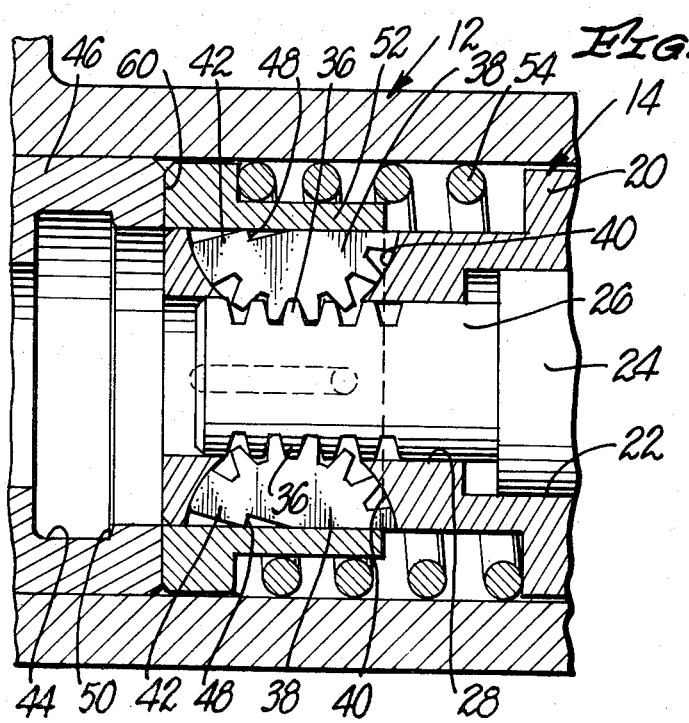
FIG. 3 is a fragmentary sectional view duplicating a portion of FIG. 2 on a larger scale.

The pinion segments 38 are respectively provided thereon with locking teeth 42 which are disposed in an internal annular locking groove 44 in a locking ring 46 within the cylinder 12. This locking ring is rigidly secured to the cyinder 12 in any suitable manner and may be regarded as constituting a part of the cylinder. As best shown in FIG. 3, the locking teeth 42 have locking shoulders 48 thereon which are engageable with an annular locking shoulder 50 formed by one side of the locking groove 44. The locking shoulders 48 and the locking shoulder 50 are complementarily radiused to achieve full contact between the locking teeth 42 and the locking shoulder 50 over the entire areas of the locking shoulders 48, which is an important feature.

As the rack member 26 is displaced from its retracted position, FIG. 2, to its extended position, FIG. 1, in a manner to be described hereinafter, the racks 36 pivot the pinion segments 38 from retracted positions to extended positions so as to displace the locking teeth 42 laterally of the piston 14 from retracted positions to extended positions. To preclude lateral extension of the locking teeth 42 before the piston 14 substantially reaches its locked position, a retaining means is provided to h     old the locking teeth in their retracted positions. This retaining means comprises a retaining sleeve 52 axially slideable on the piston extension 20, which is cylindrical. This retaining sleeve 52 is biased toward an extended position, FIGS. 2 to 4, by a compression coil spring 54 seated at its ends against external annular shoulders on the retaining sleeve and the piston extension. A pin 56, FIG. 4, carried by the piston extension 20 and disposed in a longitudinal slot 58 in the retaining sleeve 52 prevents spring biased movement of the retaining sleeve 52 past its extended position.

Figure 2:
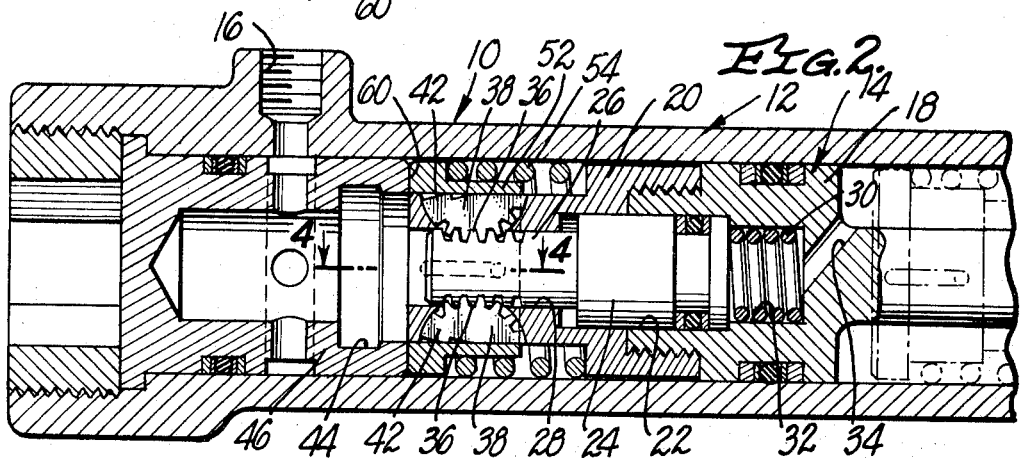
FIG. 2 is a view similar to FIG. 1, but showing the piston unlocked.
Figure 4:
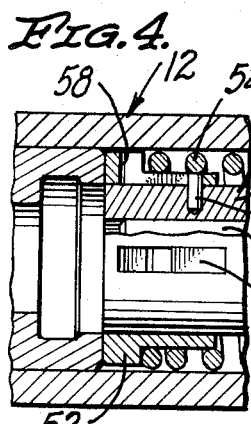
FIG. 4 is a fragmentary sectional view taken as indicated by the arrowed line 4—4 of FIG. 2.

As shown in FIGS. 2 to 4, as the piston 14 approaches its locked position, the retaining sleeve 52 engages an annular stop shoulder 60 within the cylinder 12 and formed by one end of the locking ring 46. Further displacement of the piston 14 toward its locked position causes the shoulder 60 to retract the retaining sleeve 52 against the action of the spring 54. When the retaining sleeve 52 is fully retracted, as shown in FIG. 1, the pinion segments 38 are free to pivot the locking teeth 42 into the locking groove 44.

Considering the operation of the invention, it will be assumed that the piston 14 is approaching its locked position, as shown in FIGS. 2 to 4. When the retaining sleeve 52 engages the shoulder 60, the retaining sleeve is retracted, relative to the piston 14, upon continued movement of the piston toward its locked position. Ultimately, the retaining sleeve 52 is retracted sufficiently to permit pivoting of the pinion segments 38 into their extended positions, FIG. 1, to enable the locking teeth 42 to enter the locking groove 44, also as shown in FIG. 1. Such pivoting of the pinion segments 58 is, of course, produced by axial movement of the rack member 26 toward its extended position. Such axial movement of the rack member 26 is produced partially by the spring 30, and partially by fluid pressure acting on the right end of the piston 14 and acting on the plunger 24 of the rack member 26 through the port 34. Once the various parts are in the positions shown in FIG. 1, the piston 14 is positively locked and will remain locked until release thereof is desired.

To release the piston 14, it is merely necessary to apply fluid pressure to the left and thereof, as viewed in the drawings, through the port 16. Such fluid pressure acts on the left end of the rack member 26 to displace it to its retracted position, as shown in FIGS. 2 to 4. Such displacement of the rack member 26 results in retraction of the locking teeth 42 as the result of rack-induced pivoting of the pinion segments 38.

As will be apparent from the foregoing, the locking action of the piston 14 takes place automatically upon arrival of the piston at its locked position. Similarly, unlocking takes place automatically whenever fluid pressure is applied in a direction to displace the piston 14 away from its locked position. Until such fluid pressure is applied, the piston 14 will remain locked.

Figure 5:
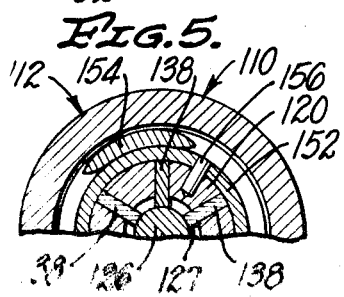
FIG. 5 is a fragmentary transverse sectional view illustrating an alternative embodiment of the invention.

Turning to FIG. 5 of the drawing, illustrated therein is an alternative motor 110 which is similar to the motor 10 so that corresponding components will be identified by reference higher by 100 than those utilized in connection with the motor 10.

In the motor 110, the rack member 126 is provided with a cylindrical rack with external annular teeth 127. The piston extension 120 carries a plurality of pinion segments 138 spaced apart circumferentially of the piston extension and meshed with the annular rack teeth 127. With this construction, numerous large-area locking contacts between the piston and the cylinder are possible, which is an important feature.

Although exemplary embodiments of the invention have been disclosed for purposes of illustration, it will be understood that various changes, modifications and substitutions may be incorporated in such embodiments without departing from the spirit of the invention as defined by the claims appearing hereinafter.

I claim as my invention:

1. In a reciprocatory fluid actuated motor having piston locking means, the combination of:
   a. a cylinder;
   b. a piston reciprocable in said cylinder toward and away from a locked position;
   c. a rack member carried by and reciprocable relative to said piston between retracted and extended positions and including a rack;
   d. a pinion segment carried by said piston and meshed with said rack and having a first locking element thereon;
   e. said pinion segment being pivotable between a retracted position wherein said first locking element is retracted laterally of said piston and an extended position wherein said first locking element is extended laterally of said piston, in response to movement of said rack member between its retracted and extended positions, respectively;
   f. a second locking element carried by said cylinder and engageable by said first locking element in said extended position of said pinion segment; and
   g. actuating means for moving said rack member between its retracted and extended positions relative to said piston.

2. A reciprocatory fluid actuated motor according to claim 1 including retaining means for retaining said pinion segment and said rack member in their retracted positions when said piston is spaced from said locked position thereof.

3. A reciprocatory fluid actuated motor as defined in claim 2 wherein said retaining means includes:
   a. a retaining sleeve slidable on said piston between an extended position, wherein it engages said pinion segment to retain it in its retracted position, and a retracted position;
   b. spring means biasing said retaining sleeve toward its extended position; and
   c. means on said cylinder for moving said retaining sleeve toward its retracted position in response to movement of said piston toward its locked position.

4. A reciprocatory fluid actuated motor as set forth in claim 2 wherein said actuating means for said rack member comprises means for applying fluid pressure to opposite ends of said rack member.

5. A reciprocatory fluid actuated motor according to claim 4 including spring means biasing said rack member toward its extended position.

6. A reciprocatory fluid actuated motor as defined in claim 2 wherein said second locking element is an internal annular locking shoulder in said cylinder and said first locking element is a locking tooth on said pinion segment and engageable with said shoulder.

7. A reciprocatory fluid actuated motor according to claim 6 wherein said shoulder and said tooth are complementarily radiused.

8. A reciprocatory fluid actuated motor as set forth in claim 6 including two circumferentially spaced racks on said rack member and two circumferentially spaced pinion segments respectively meshed with said racks and respectively having locking teeth engageable with said locking shoulder.

9. A reciprocatory fluid actuated motor as defined in claim 6 wherein said rack is cylindrical with annular teeth, there being a plurality of said pinion segments circumferentially spaced around and meshed with said rack and respectively having locking teeth engageable with said locking shoulder.

10. In a reciprocatory fluid actuated motor having piston locking means, the combination of:
    a. a cylinder;
    b. a piston reciprocable in said cylinder toward and away from a locked position;
    c. an actuating member carried by and reciprocable relative to said piston between retracted and extended positions;
    d. a first locking element carried by said piston and engaging said actuating member, said first locking element comprising a pinion segment rotatable through a small arc relative to said piston and having thereon a first shoulder;
    e. said first locking element being movable between a laterally retracted position and a laterally extended position in response to movement of said actuating member between its retracted and extended positions, respectively;
    f. a second locking element carried by said cylinder and comprising a second shoulder engageable by said first shoulder of said first locking element in said extended position thereof; and
    g. means for moving said actuating member between its retracted and extended positions relative to said piston.

11. A reciprocatory fluid actuated motor according to claim 10 including retaining means for retaining said first locking element and said actuating member in their retracted positions when said piston is spaced from said locked position thereof.

12. In a reciprocatory fluid actuated motor having piston locking means, the combination of:
    a. a cylinder;
    b. a piston reciprocable in said cylinder toward and away from a locked position;
    c. an actuating member carried by and reciprocable relative to said piston between retracted and extended positions;
    d. a first locking element carried by said piston and engaging said actuating member;
    e. said first locking element being movable between a laterally retracted position and a laterally extended position in response to movement of said actuating member between its retracted and extended positions, respectively;
    f. a second locking element carried by said cylinder and engageable by said first locking element in said extended position thereof;
    g. means for moving said actuating member between its retracted and extended positions relative to said piston; and retaining means for retaining said first locking element and said actuating member in their retracted positions when said piston is spaced from said locked position thereof, said retaining means including a retaining sleeve slidable on said piston between an extended position, wherein it engages said first locking element to retain it in its retracted position, and a retracted position, spring means biasing said retaining sleeve toward its extended position, and means on said cylinder for moving said retaining sleeve toward its retracted position in response to movement of said piston toward its locked position.

* * * * *